United States Patent
Lee et al.

[11] 3,873,183
[45] Mar. 25, 1975

[54] OPTICAL BEAM MODULATION IN OPTICAL WAVEGUIDES

[75] Inventors: Tzuo-Chang Lee, Bloomington; Di Chen, Minnetonka, both of Minn.

[73] Assignee: Honeywell Inc., Minneapolis, Minn.

[22] Filed: July 25, 1973

[21] Appl. No.: 382,599

[52] U.S. Cl. .................... 350/96 WG, 350/160 R
[51] Int. Cl. ............................................ G02b 5/14
[58] Field of Search .................. 350/96 WG, 160 R

[56] References Cited
OTHER PUBLICATIONS

Kuhn et al. "Dynamic Generation of Switchable Optical Waveguide Components," IBM Technical Disclosure Bulletin Vol. 12, No. 11, April 1970, p. 1944.

Primary Examiner—John K. Corbin
Attorney, Agent, or Firm—David R. Fairbarin

[57] ABSTRACT

Electro-optic modulation in an optical waveguide is achieved by depositing electric charges on a surface of the electro-optic dielectric layer which serves as the waveguide.

12 Claims, 4 Drawing Figures

OPTICAL BEAM MODULATION IN OPTICAL WAVEGUIDES

BACKGROUND OF THE INVENTION

The present invention relates to thin film optical waveguides. In particular, the present invention is directed to a method and apparatus for optically modulating a light beam while it propagates through a thin film optical waveguide. The invention herein described was made under a contract or subcontract thereunder, with the Dept. of the Navy.

In recent years considerable research effort has been expended on thin film optical waveguides, which are fundamental building blocks for optical communication systems. Thin film optical waveguides make possible "integrated optics", which are rugged and compact. Some of the properties and potential of integrated optics were described by J. E. Goell, "Optical Waveguides Bring Laser Communication Closer," Electronics, Pages 60–67 (Aug. 31, 1970).

The thin film optical waveguide typically is formed by a transparent dielectric film which is deposited on or embedded in a transparent substrate of slightly lower refractive index. In general, the upper surface of the thin, transparent dielectric layer is exposed to air.

To achieve the full potential of integrated optics, there must be a capability of modulating the light beam as it passes through the optical waveguide. The typical approach has been to utilize an electro-optic material having electric field controllable birefringence as the thin transparent dielectric layer. To achieve optical modulation of the light beam in the waveguide, a modulating field is applied to the electro-optic material. The conventional technique for applying the modulating electric field is to put electrodes in intimate contact with the electro-optic layer. This approach is shown in FIG. 20 of U.S. Pat. No. 3,558,213 by E. A. J. Marcatili.

Having an electrode in direct contact with one surface of an electro-optic waveguide has been found to be unsatisfactory. Most electrode materials exhibit high refractive indices and are optically lossy. As a result, each time the optical beam strikes the interface between the electro-optic waveguide and the electrode, a portion of the light beam is absorbed in the electrode. An electrode in contact with the electro-optic waveguide layer thus limits the usable electro-optic materials and degrades the performance of the optical waveguide modulator.

Another approach for applying the electric field to an electro-optic material was described by I. P. Kaminow et al., "Thin-Film LiNbO$_3$ Electro-optic Light Modulator," Appl. Phys. Lett., 22, 540 (1973). In this approach, electrodes are evaporated on the surface of the waveguide, but not directly over the area through which the light beam will pass. A voltage is applied between the coplanar electrodes to create a fringing electric field within the waveguide, as shown in FIG. 2 of the Kaminow et al. article. Although it has been shown that this device is effective in modulating the light beam, the use of a fringing electric field is less desirable than the use of a uniform electric field.

SUMMARY OF THE INVENTION

In the present invention, no electrodes are required on the surface of the thin film optical waveguide. Instead, charges are deposited on the surface of the waveguide to produce an electric field needed for modulation of the light beam propagating through the waveguide. The deposition of charges may be achieved by many types of sources such as a corona source or a thermionic cathode.

DETAILED DESCRIPTION OF THE PREFERRED EMBODIMENTS

Figure 1:
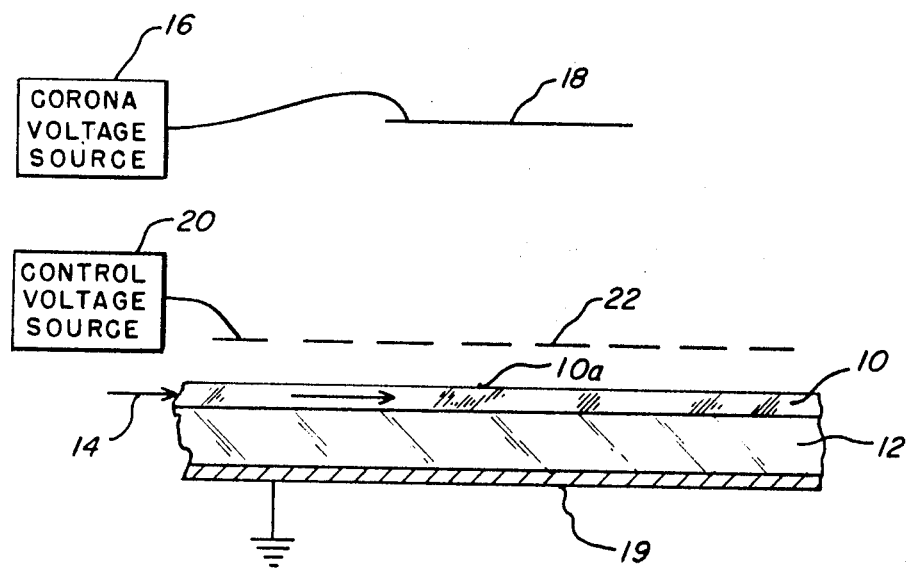
FIG. 1 shows a thin film optical waveguide modulator in which electric charges are deposited on a surface of the waveguide by a corona source.

One embodiment of the present invention is shown in FIG. 1. A thin film optical waveguide 10 is deposited on or formed in substrate 12. A light beam 14 propagates through thin film optical waveguide 10.

To modulate light beam 14, thin film optical waveguide 10 has an electric field controllable optical property. In particular, thin film optical waveguide 10 is preferably an electro-optic material having electric field controllable birefringence. Suitable materials for thin film optical waveguide 10 include lithium niobate and lanthanum-modified lead zirconate titanate (PLZT).

The electric field controllable property of thin film optical waveguide 10 is selectively altered by depositing electric charges on selected regions of surface 10a of thin film optical waveguide 10. The deposited charges produce the electric field needed to change the electric field controllable optical property of the waveguide 10 and thus modulate light beam 14.

In FIG. 1 is shown one means for depositing charge on surface 10a of waveguide 10. Corona voltage source 16 applies a voltage to corona electrode 18 to cause a corona discharge. Corona electrode 18 may be a corona wire or corona sheet of the type well known for generating corona discharges.

A ground plane 19 is provided in the waveguide as is also shown in FIG. 1 so that ions generated near the corona will flow to the waveguide. Ground plane 19 can be a metal layer deposited on the bottom of the substrate 12 which is below the light guiding layer 10.

Although it is possible to control the amount and duration of charges deposited on surface 10a by controlling the corona voltage from corona voltage source 16, this requires control with relatively high voltages. A highly advantageous way of controlling the amount and duration of charges deposited on surface 10a is shown in FIG. 1. Control voltage source 20 controls the potential of control grid 22, which is positioned between corona electrode 18 and surface 10a. By the use of a control grid 22 for charge control, it is possible to control the amount and duration of electric charge deposited on surface 10a with relatively low voltages.

In operation, corona voltage source 16 applies a voltage to corona electrode 18 to generate a corona discharge. Control voltage source 20 applies a voltage to control grid 22 to control the amount and duration of charges deposited on surface 10a of waveguide 10. The charges deposited on surface 10a produce an electric field through waveguide 10 which alters the birefringence of waveguide 10. As a result, light beam 14 is modulated as it passes through that region of waveguide 10.

The light beam modulation system of the present invention allows relatively high speed operation. For example, if the corona current is $50\mu a$ and the capacitance of waveguide 10 is 500pf (assuming an area = 1 cm × 0.05 cm, a thickness = 1 micron, and a dielectric constant $\epsilon = 10$), then the switching time for the modulator is $10\mu s$ to charge the waveguide to $10^4$V/cm.

In the embodiment shown in FIG. 1, charge is removed from surface 10a simply by charge leakage through waveguide 10. The switch-off time of the modulator thus depends on the dielectric relaxation time $\rho\epsilon$ of waveguide 10. For example, if $\rho = 10^7$ohm cm and $\epsilon = 10$, then the dielectric relaxation time $\rho\epsilon = 10\mu s$. The dielectric relaxation time of waveguide 10 may be adjusted by modifying the resistivity $\rho$ by proper doping of the material forming waveguide 10. When charge leakage is used to remove the deposited electrical charges, the retention of charge on surface 10a is relatively short. To continue modulation of light beam 14, it is necessary to continue to deposit charge. When modulation is no longer desired, control grid 22 blocks charge from reaching surface 10a and the charge already on surface 10a is dissipated by leakage.

Figure 2:
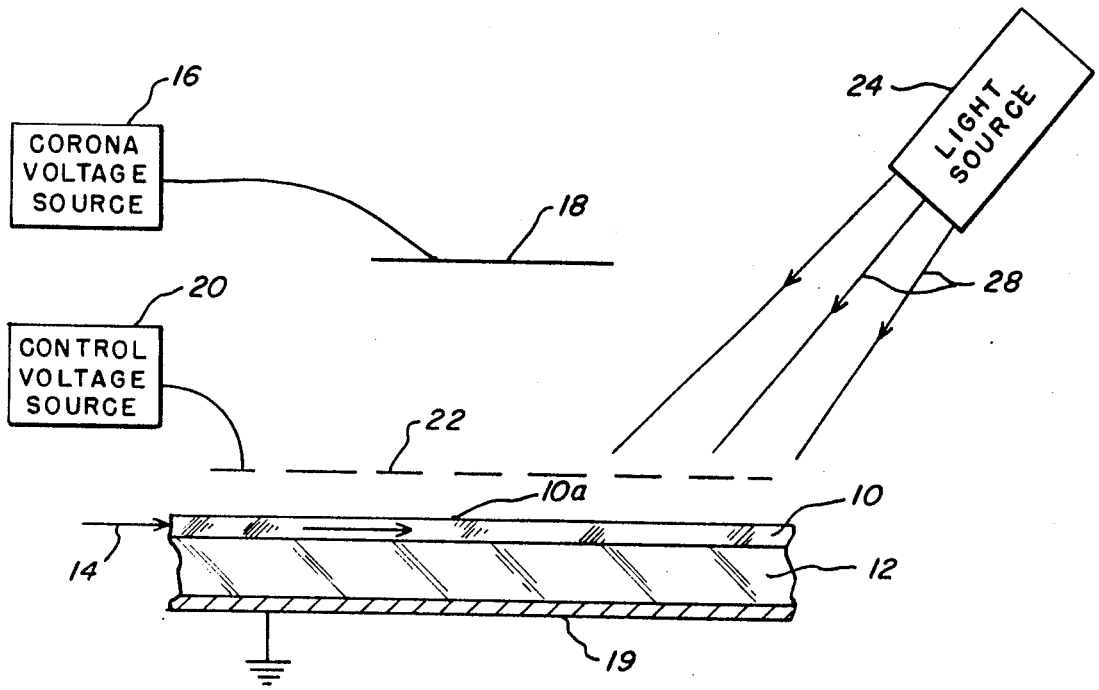
FIG. 2 shows a thin film optical waveguide modulator of the present invention including means for removing deposited electrical charge from the surface of the waveguide.

Another means of removing deposited charge from surface 10a is shown in FIG. 2. This system is similar to FIG. 1, and similar numerals are used to designate similar elements. In FIG. 2 waveguide 10 exhibits photoconductivity with certain wavelengths of light. These wavelengths are different from the wavelength of light beam 14. To control the rate of removal of deposited charge from surface 10a, light source 24 of controlled intensity directs light rays 28 onto waveguide 10. Light rays 28, which are of a wavelength absorbed by waveguide 10, increase the conductivity of waveguide 10 and thus allow the electrical charge on surface 10a to be dissipated.

Figure 3:
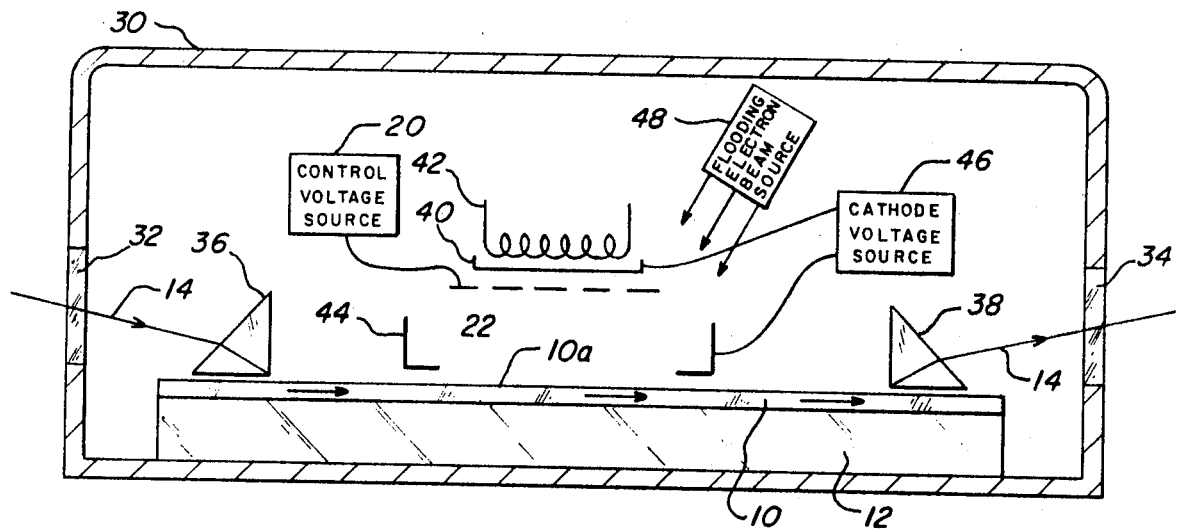
FIG. 3 shows a cross sectional view of an optical modulation system in which electrons are deposited on a surface of a thin film optical waveguide by a thermionic source.

FIG. 3 shows a thin film optical waveguide modulation system in which a thermionic cathode is the source of electrical charge. The entire system is enclosed in vacuum envelope 30. Light beam 14 enters envelope 30 through window 32 and exits through window 34. Optical coupling prismss 36 and 38 couple light beam 14 into and out of waveguide 10 respectively.

The source of electrical charge in FIG. 3 is cathode 40, which is heated by heater coil 42. Electrons are generated by cathode 40 and are directed toward surface 10a by the potential between cathode 40 and anode 44 generated by cathode voltage source 46. As shown in FIG. 3, anode 44 may be an open ring positioned proximate surface 10a, or it may comprise a conductive sheet on the back surface of substrate 12.

The electron flow from cathode 40 to surface 10a is controlled by the grid potential on control grid 22. Although the electron flow could be controlled by the potential between cathode 40 and anode 44, control grid 22 allows the electron flow to be controlled with much lower voltages.

The system shown in FIG. 3 has several advantages. A large current is available in this system, and the response time of the modulator therefore can reach the nanosecond range. The response time then becomes controlled by the electron transit time and interelectrode capacitance.

The removal of charge from surface 10a in the system of FIG. 3 may be by the methods described above for FIGS. 1 and 2. Alternatively, charge removal may be controlled by a flooding electron beam which causes secondary emission of electrons from surface 10a. When secondary emission is used to remove charge, a flooding electron beam source 48 may be required.

Figure 4:
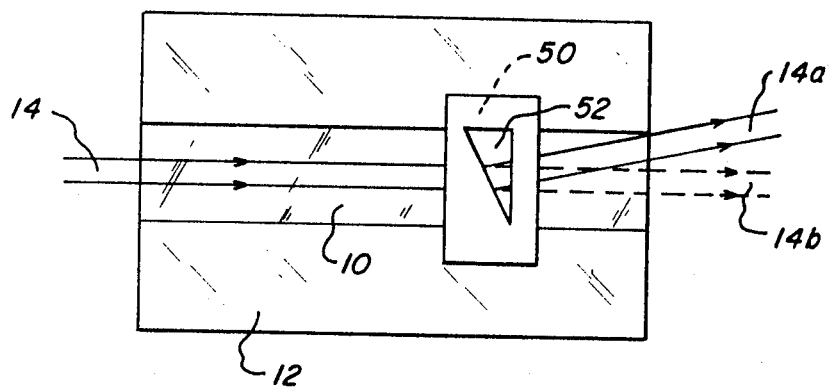
FIG. 4 shows a top view of an optical waveguide used for deflection of a light beam.

FIG. 4 shows a top view of an embodiment of the present invention in which light beam 14 is selectively delfected. Mask 50 is positioned proximate surface 10a of waveguide 10. An aperture 52 in mask 50 defines a charge pattern which is deposited on surface 10a. The charges from the electric field charge source must pass through mask 50 to reach surface 10a.

As shown in FIG. 4, mask 50 may be used to generate a charge pattern on surface 10a which results in a deflection of light beam 14. The deflected position of light beam 14 when charge is deposited on surface 10a is designated as light beam 14a. The undeflected position, which is shown in dashed line, is designated as position 14b.

In conclusion, the present invention allows modulation of a light beam in an electro-optic waveguide layer without an electrode in contact with the electro-optic waveguide. Losses and adverse modification of waveguide properties imposed by an electrode in contact with the waveguide are thus avoided. In addition, the present invention is simple to implement in an optical waveguide system.

Although this invention has been disclosed with particular reference to preferred embodiments, it will be understood by those skilled in the art that changes in form and details may be made without departing from the spirit and scope of the invention.

The embodiments of the invention in which an exclusive property or right is claimed are defined as follows:

1. A method of modulating a light beam comprising:
    directing the light beam through a thin film optical waveguide having an electric field controllable optical property;
    generating electrical charges at a position remote from a surface of the thin film optical waveguide;
    depositing electrical charge on a selected region of the surface of the thin film optical waveguide to selectively alter the electric field controllable optical property; and
    removing the deposited electrical charge from the selected region by directing a flooding electron beam onto the surface to cause secondary emission of electrons from the surface.

2. A method of modulating a light beam comprising:
    directing a light beam through a thin film optical waveguide having an electric field controllable optical property, the thin film optical waveguide having electrical conductivity which is controllable by radiation of particular wavelengths;
    generating electrical charges at a position remote from a surface of the thin film optical waveguide;
    depositing electrical charge on a selected region of the surface of the thin film optical waveguide to selectively alter the electric field controllable optical property; and removing the deposited charge from the selected region by directing radiation of wavelengths capable of increasing the conductivity of the thin film optical waveguide onto the selected region of the surface of the thin film waveguide.

3. A light beam modulation system comprising:

an optical waveguide layer having an electric field controllable optical property; and means for depositing electrical charge on a selected region of a surface of the optical waveguide layer to selectively alter the electric field controllable optical property, the means comprising:

electric charge source means for producing electrical charge;

control grid means positioned between the electric charge source means and the optical waveguide layer; and control voltage source means for applying a voltage to the grid means for controlling the amount of electrical charge deposited on the surface of the optical waveguide layer.

4. The light beam modulation system of claim 3 wherein the electric charge source means comprises a corona source means.

5. The light beam modulation system of claim 4 wherein the corona source means comprises:

corona electrode means; and corona voltage source means for applying a voltage to the corona electrode means sufficient to generate a corona discharge.

6. The light beam modulation system of claim 5 wherein the corona electrode means comprises a corona wire.

7. The light beam modulation system of claim 5 wherein the corona electrode means comprises a corona sheet.

8. The light beam modulation system of claim 3 wherein the electric charge source means comprises:

cathode means for generating electrons; and anode means positioned proximate the optical waveguide layer.

9. The light beam modulation system of claim 8 wherein the electric charge source means further comprises:

cathode voltage source means for applying a voltage between the cathode means and the anode means.

10. The light beam modulation system of claim 8 wherein the anode means comprises an open anode ring proximate the surface of the optical waveguide layer.

11. The light beam modulation system of claim 3 and further comprising:

container means for enclosing the cathode means, the anode means, and the optical waveguide layer in a vacuum.

12. The light beam modulation system of claim 3 and further comprising:

mask means positioned proximate the surface of the optical waveguide layer for defining a selected region on the surface of the optical waveguide layer upon which electrical charge may be deposited.

* * * * *